Figure 3:
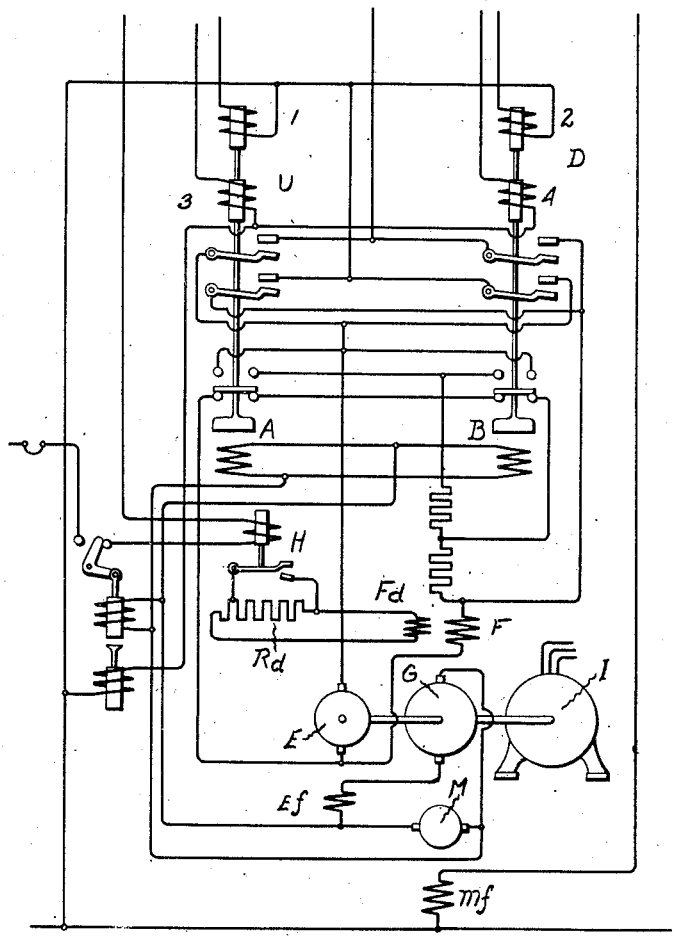

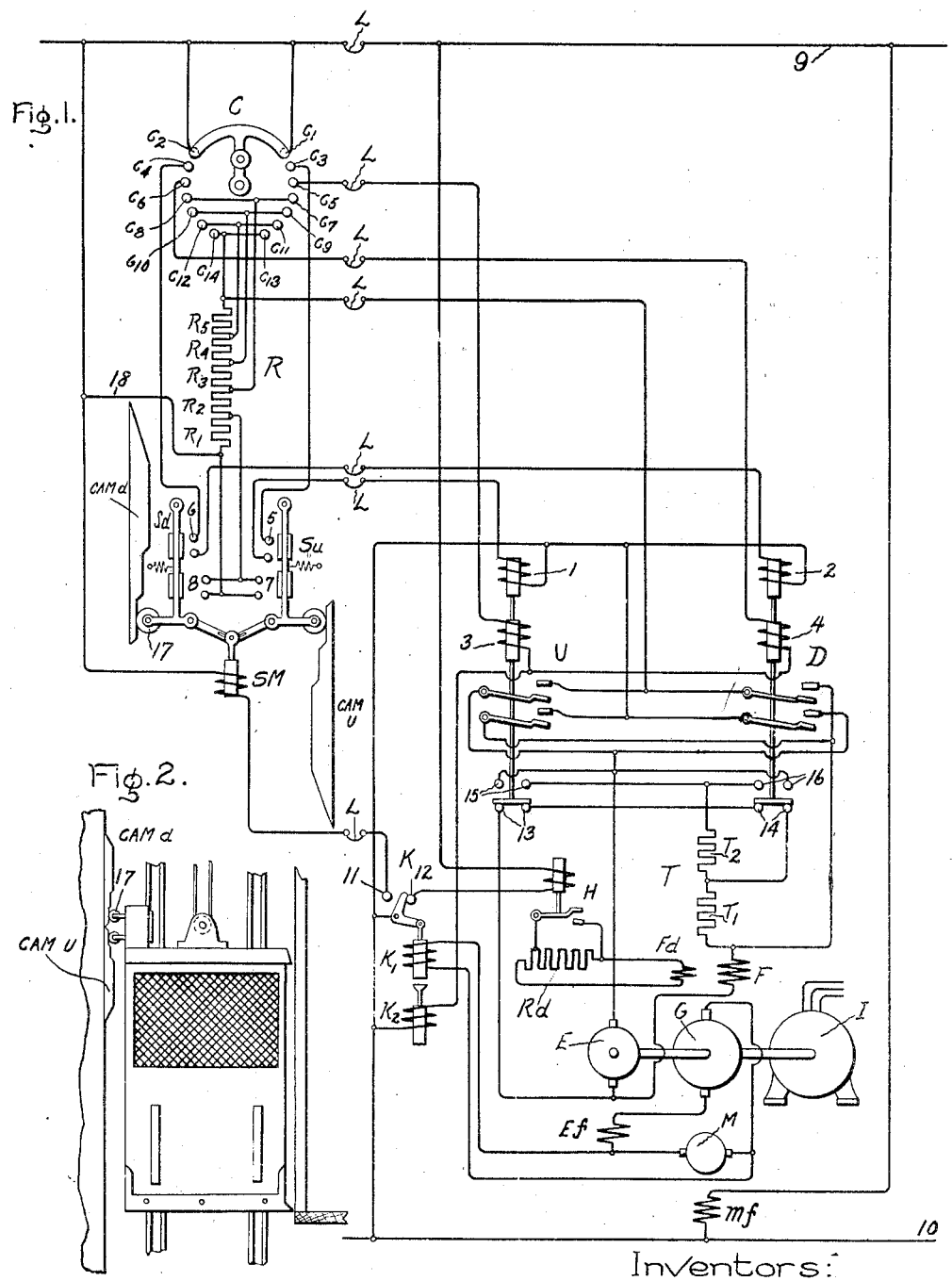

Patented Mar. 24, 1931

1,797,970

UNITED STATES PATENT OFFICE

MAX A. WHITING AND ELLIOTT D. HARRINGTON, OF SCHENECTADY, NEW YORK, ASSIGNORS TO GENERAL ELECTRIC COMPANY, A CORPORATION OF NEW YORK

SYSTEM OF MOTOR CONTROL

Application filed April 21, 1926. Serial No. 103,604.

Systems of control for electric elevators, hoists and the like, have heretofore been proposed to effect an accurate landing by automatic means whenever the car, hoist or the like, has been brought to rest or nearly to rest within a prescribed distance of the desired landing. Such systems are termed automatic leveling systems, and as heretofore proposed, such systems have involved numerous complications in the mechanical driving system such as a plurality of driving motors, or complications in the electrical system such as a plurality of different voltage sources of supply and the ensuing complications in the motor controlling switch mechanism and connections.

One of the objects of our invention is to provide a system of electric drive for a moving structure having a limited travel in which a single motor is mechanically connected to drive the winding drum or traction sheave or other system of mechanical transmission, and in which the characteristics of this motor and its associated electrical apparatus are highly improved, a system of control devices to be provided and associated with the respective stopping points or landings desired, whereby a comparatively high speed of operation may be had and the desired accuracy for the stops or landings may be obtained.

While the invention finds a particular use for the operation of elevators and provides the advantages described, it is not necessarily limited to elevators, nor to vertical motion, but tends to be applicable broadly to various kinds of motion in which an accurate stop is required at various predetermined positions within the total range of travel.

Although not necessarily limited thereto, our invention is particularly applicable in conjunction with the control for dynamo electric machines for which Max A. Whiting filed an application for patent on February 10, 1923, Serial No. 704,059, and assigned the same to the same assignee to whom this application is assigned. An automatic stop mechanism comprising groups of floor cams and switch contact mechanism carried by the car are provided whereby the precise speed regulating characteristics of Whiting's system can be taken advantage of, and whereby precise stopping may be had by the use of a single motor connected mechanically to the moving structure.

As commonly practiced, the method of operating an elevator in order to take advantage of the automatic leveling characteristics has been as follows: The operator judges his stops as best he can and retards the controller either directly to the "off" position, or first to a reduced speed position and then to the "off" position, so that the car arrives within the leveling zone at a reduced speed, whereupon, if the car switch be allowed to remain at the "off" position, the car will be leveled automatically to the floor. It is characteristic of a system of this type that, once the car has arrived within the leveling zone, the operator cannot stop the motion of the car by means of the car switch, and it is sometimes urged against a system of this type that it is somewhat less safe on this account than an equipment of ordinary non-automatic leveling type. It is also urged against a system of the type described that it encourages an operator to become inattentive to his work.

An object of our invention is to arrange an automatic stopping control that the car switch will have an "off" position upon which the car will come to rest regardless of the automatic stopping control and one or more automatic stopping positions upon which the automatic stopping control will be operative in accordance with the position of the car relatively to the automatic stopping devices located along the elevator shaft adjacent the desired landings. Thus the operator, at will, can utilize the automatic stopping apparatus or can stop the car by means of the car switch whenever he wishes, irrespective of the automatic stopping apparatus. Thus, also, the operator is not tempted to become inattentive, since to obtain the advantage of the automatic stopping feature he must be sufficiently alert to use the proper position of the car switch.

Another object of our invention is to accomplish our purposes by means of a simple system of electrical connections. Many systems of motor control devised to embody complex sequential relations of the various operating conditions are characterized by complicated circuits in which the actuating current for the same device is obtained in succession through various different circuit combinations sometimes comprising numerous branches and sub-branches, which combinations shift repeatedly and are substituted, one for another, during the processes of control. When complication of this character is applied to each of several inter-related devices in a system, the complication of the complete system becomes very great and possesses substantial disadvantages. Persons, even if skilled in the general art but previously unacquainted with the particular system may have considerable difficulty in understanding the system; numerous opportunities are presented for inadvertent errors in wiring, even on the part of persons who are both skilled in the art and experienced in the particular system. Furthermore, it is difficult to accurately design and reduce to practice new adaptations of such a system. In our invention, although necessarily a plurality of devices and circuits is required for the accomplishment of our purposes, we have nevertheless so contrived our invention that the various circuits and their operation are simple and tend to be readily comprehensible to persons of only moderate skill. This will appear more particularly as the system is explained in detail hereinafter.

Other objects will either be apparent to those skilled in the art or will appear in the course of the disclosure hereinafter.

In the accompanying drawings, Fig. 1 is a simplified drawing of a system of control in accordance with the invention; Fig. 2 is a detail showing the elevator car and the automatic stop mechanism and Fig. 3 is a detail modification of the arrangement of Fig. 1.

For the successful working of our invention, particularly for high speed elevators or for very accurate stopping under varying conditions of load, it is desirable that the traction motor, in combination with its associated apparatus, be characterized by a close speed regulation over the entire range of load, particularly when the control apparatus is positioned for a low speed. To this end, we prefer to use the said Whiting system of control for dynamo-electric machines, and our invention, although it is not so limited in its broadest aspects, will be particularly described in a form which makes use of Whiting's system.

A brief explanation of certain features of the said Whiting system will be presented in order to thereby obtain a better understanding of the present invention.

In a group of apparatus for operating a direct current motor with what is known as Ward Leonard control, the motor itself has a substantial armature IR drop, which is relatively very high in the case of a gearless elevator motor, and which causes a drooping speed regulation. The generator itself has a substantial IR drop and the motor-generator has a drooping speed regulation, both of which tend to make the speed regulation of the traction motor still worse. Thus the speed regulation over the entire range of loads due to the additive effect of all these causes is rather poor.

The obvious way to attempt to overcome this drooping speed regulation of the elevator motor is by supplying compounding windings for the generator. However, the rather large proportion of compounding required for the best speed regulation cannot be obtained very suitably by applying to the generator a series field of the ordinary type since the compounding effect, if sufficient at full speed of the motor, that is to say, at full generator voltage, is excessive under certain other conditions and tends toward unstable operation or abuse of the apparatus.

In order to overcome this difficulty, Whiting devised an improved system in which an auxiliary exciter having a series effect is used to provide the desired compounding of the generator. Fig. 1, which shows an embodiment of our invention, illustrates also an embodiment of Whiting's system. Whiting's apparatus comprises a shunt wound, separately excited motor M for driving the load through mechanical connections not shown. The load in the present case will be considered the elevator car shown in Fig. 2. The motor M is operated on the Ward Leonard principle by generator G, which is conveniently driven by induction motor I. The energy for exciting the field winding $mf$ of motor M is derived from exciting bus 9—10, which is maintained at substantially constant potential. The field winding F of generator G is supplied with energy from the same source. The field $Ef$ of exciter E is excited by the load current of motor M and the armature of this exciter is connected in series with the separately excited shunt field F of generator G. By virtue of this arrangement, exciter E generates a voltage which, within limits, is approximately proportional to the load current of the generator and which therefore boosts or bucks the excitation of field F of generator G. Those skilled in the art will appreciate from a consideration of Fig. 1 that exciter E will boost the generator excitation when the load is of positive sign, that is to say, when motor M is loaded as a motor; will buck the generator excitation when the load is of negative sign, that is to say, when motor M is loaded regeneratively; and will preserve this relation irrespective of the operation of the driven device, that is to say, regardless of the operation of the reversing switch mechanism which comprises the "up" contactor U and the "down" contactor D. Thus, by this indirect means, the generator is compounded.

In a system of dynamo-electric machines for Ward Leonard control, particularly when used for rapid acceleration and retardation of the driven machinery, the difficulties which tend to occur by reason of a high degree of compounding obtained by ordinary means which are overcome by Whiting's system are two: The first difficulty is that at high overload currents a nearly proportionate increase of compounding tends to occur, which is usually not required and is likely to be abusive of the apparatus. The series exciter is accordingly designed to become saturated when excited by a load current only moderately greater than the maximum current at which it is desired to maintain good speed regulation of motor M, and the compounding effect provided by exciter E is thus limited at overloads to much less than a proportionate increase. The second difficulty is that when a compounding effect has been applied to the generator by the ordinary means and has been made powerful enough at the full voltage of the generator, when the generator saturation is fairly high, the same compounding means when operating upon an unsaturated generator field structure will cause an excessive degree of compounding of the generator magnetism. The substitution of exciter E in place of a compounding winding directly upon the generator avoids this second difficulty in the following manner: The armature of exciter E is connected in series with the generator field and the controlling resistor R, so that when R is in circuit, thereby tending to work the generator at a low degree of saturation, R also reduces the component of current by which the voltage of E can boost or buck the generator excitation.

The limiting effect imposed on exciter E by resistor R when in circuit as just explained is so great that on the lowest speed position of the control the exciter E whose voltage has been selected to satisfy the requirements for regulation at full speed provides even less improvement of regulation at the lowest speed than is desired. Resistor T is therefore used, connected to form a branch circuit around exciter E and generator field F. At the full speed position, resistor R being short-circuited, resistor T has no effect, as T is then connected directly across excitation bus 9—10. At the lowest speed position, R being in circuit, resistor T becomes effective.

There are now two paths, partly coinciding and partly distinct, by which exciter E can affect generator field F. Assuming that control C is on the $c_6$ position and contactor D is energized and closed, the first of these two paths or circuits is from excitation bus 9 through conductor 18 and resistor R, through the upper main contact of contactor D, through F, through the armature of exciter E, through the lower main contact of contactor D to excitation bus 10. Through this circuit exciter E can exert a small effect upon generator field F, this effect being limited by resistor R. The second circuit is a local circuit through the armature of exciter E, generator field F, resistor T (comprising $T_1$ and $T_2$), auxiliary switch 16 of contactor D and back to E; through this second circuit exciter E can apply an additional component of excitation to field F. The less the resistance of resistor T the greater is this second component of excitation which E can apply to F. In one limiting case, in which resistor T is reduced to zero, the current in generator field F will be determined solely by exciter E, and will therefore vary solely in accordance with the load current. In the other limiting case, in which resistor T is infinitely high, i. e., when the local circuit through resistor T is open, the greater degree of improvement of the regulation at low speed is not obtained.

It is evident, therefore, that when the controller is on the lowest speed position as described, the proportionate effect of exciter E may be increased to a high degree by reducing the value of resistor T, and conversely may be reduced by increasing the value of resistor T.

Auxiliary contacts 15 and 16 of contactors U and D, respectively, are connected in multiple with each other and provide that when the controller is at the "off" position the circuit through resistor T is opened, thus effectively preventing exciter E from continuing to excite generator G. Auxiliary contacts 13 and 14 of contactors U and D respectively, are connected in series, and provide that when the manually operable controller C is in the "off" position, a discharge circuit for generator field F is established through resistor $T_1$.

By selecting proper values of resistors R and T in relation to the resistance of generator field F, the no-load speed on the first point can be selected and the degree of compounding on the first point, and thereby the speed regulation, can be adjusted. It has been found that in an apparatus of this character it is practicable to so adjust the compounding provided by the exciter that upon the full speed position of the controller the motor speed, when hoisting the maximum load, may be made equal to the speed when overhauled by the load, furthermore, that upon the lowest speed position of the controller the motor speed when hoisting the maximum load may be made equal to or greater than the speed when overhauled by the load. The speed regulations thus obtained aid in securing that substantial uniformity in the operation of the apparatus irrespective of load which is advantageous for the purposes of automatic leveling.

Having thus explained a preferred system of dynamo-electric machinery for use in an embodiment of our invention, we will now describe the cooperating apparatus and connections whereby our invention is carried into effect. The means of cooperation between the controlling device in the elevator car and the electrical equipment mounted upon the stationary structure of the building consists of flexible conductors sometimes known as "traveling" leads. In order to show that the additional traveling leads required by our invention are not excessive in number we show a suitable grouping of the apparatus with respect to an elevator. In Fig. 1, the parts contained within and mounted upon the elevator car are the controller C, the automatic limit switch or stopping contact mechanism $Su$, $Sd$, and the controlling electromagnet SM, together with the electrical connections between these parts. The loops L represent the "traveling" leads thus required for the electrical circuits between the elevator car and the stationary apparatus. In case our invention is applied to a different use, for example, the accurate stopping of a transfer table or larry car at various predetermined positions a specifically different arrangement of traveling leads may be employed, or the apparatus may be differently grouped with respect to location and may be served by rail or trolley wire conductors, in a manner which will be understood by those skilled in the art.

In Fig. 1, the master controller C is provided with a handle for manual operation. In an elevator, controller C is commonly located on the elevator car and is known as a "car switch". In our embodiment, car switch C is a combined master controller for the operation of contactors U and D, and direct controller for short-circuiting the various steps of resistor R. Motor M, with its separately excited shunt field $mf$, generator G with its separately excited reversible shunt field F and the induction motor I, are of the type and general arrangement usual for Ward Leonard control. Winding $F_d$ is a damping winding on the generator main poles in order to adjust the maximum rate at which the generator magnetism can increase and decrease. Contactor H is provided for controlling the damping resistor $Rd$ in order that the damping effect of field $Fd$ may be rendered weak or may be eliminated under certain conditions of operation, as will appear.

The automatic stopping switches $S_u$ and $Sd$ are shown in their respective positions when the car has come to rest at a predetermined landing. It is preferable to use only one group of automatic stopping or limits switches as shown, mounted on the car to travel with the car. In this case the automatic stopping cams, $CAM_u$ and $CAM_d$, are repeated, one group for each floor or stopping place, and mounted in the hatchway upon the stationary structure. As shown, the roller 17 of switch $S_u$ and the cooperating member $CAM_u$ are in one vertical plane and the other roller and cam are in an offset parallel plane, whereby switch $S_u$ can operate only with $CAM_u$ and $S_d$ similarly can operate only with $CAM_d$. This construction is convenient for the illustration of our invention, but is not essential, and we conceive that various forms of automatic stopping or limit switch mechanism groups might be devised which would be suitable for use with our invention. As shown, the magnet SM, when energized withdraws both automatic stopping switches so that they cannot engage their respective cams, and when deenergized, releases both switches so that their respective springs push them into the positions in which they will respectively engage their cams if the cams are alongside. It is not necessary to our invention that the arrangement shall be one in which a magnet is energized to withdraw the automatic stopping switches from the engaging position with respect to the cooperating cams, and those skilled in the art will readily supply equivalent mechanism and control for accomplishing similar functions. Each of these automatic stopping switches has, in addition to the withdrawn position, three operating positions, one as shown, in which both its circuits are open, a second position with its roller riding the intermediate surface of the cam, whereupon its contact 5 or 6 is closed but 7 or 8 is open, and a third position with its roller riding the highest surface of the cam, whereupon both its contacts are closed. When magnet SM is energized and both automatic stopping switches are thereby withdrawn, contacts 7 and 8 remain closed, and contacts 5 and 6 may be conveniently but not necessarily arranged to remain closed. As hereinafter described, contacts 5 and 6 are closed when their respective automatic stopping switches are withdrawn. Bearing in mind that the two cams are not in the same plane, it is evident from Figs. 1 and 2 that wherever the automatic stopping switches may be, in accordance with the position of the elevator car in the hatch when magnet SM is deenergized, both automatic stopping switches cannot simultaneously be sustained by their cams in circuit closing positions.

Relay K is provided with two mechanically separate magnets K1 and K2. The energization of K2 will cause the plunger of K1 to be lifted but when K2 is deenergized the plunger of K2 will drop free from the plunger of K1 whereupon the contact controlled by K1 is free either to be held up or to drop, according to the voltage across coil K1. As connected, K2 is either energized by a definite current which is ample to lift the entire relay, or is deenergized, but K1 is energized by a current proportional to the terminal voltage of the armature of motor M. Therefore, after having been lifted as described, K1 drops only after K2 drops, but then only when the terminal voltage of motor M drops to a predetermined value. The contacts of relay K are used to govern the engagement and withdrawal of the automatic stopping switch contact mechanism $S_u$ and $S_d$ and to govern the resistance in circuit with the damping field $F_d$, as will appear.

Relay K is thus a device responsive approximately, and sufficiently for the purpose, to the speed of motor M, and is used to limit the cooperation of the automatic stopping switches in accordance with the speed of the moving structure and to limit or modify the action of other operating characteristics of the apparatus correspondingly, as may be found desirable. Relay K, as shown, is merely a convenient device for the purpose, but other forms of relay or devices other than electro-magnetically operated contacts may readily be substituted.

Contactor U, which applies the excitation to the generator field for one direction has preferably two separate magnets, 1 and 3, either of which is alone capable of closing the contactor. At times magnet 1 closes the contactor, at other times magnet 3 closes the contactor and at times both these magnets may be energized simultaneously. Similarly contactor D is preferably provided with two corresponding separate magnets 2 and 4 for a similar purpose. By virtue of this construction, a simple arrangement of circuits is possible whereby contactor U may be actuated by either car switch C alone or by car switch C in conjunction with automatic stopping switches $S_d$ and $S_u$, as will appear. Contactor D is identical with contactor U. This particular arrangement, while preferred by us, is not essential, since if, for example, coils 1 and 3 are placed upon the same magnet of contactor U, these coils will be connected for like polarity to ensure that when both are energized simultaneously the contactor will not drop open.

Coil 1 and coil 2 are wound in the ordinary manner, suitably for operation at the full voltage of the exciting bus 9—10. Coil 3 and coil K2, however, are so wound that when coil 3 and coil K2 are connected in series across the exciting bus, coil 3 will close contactor U and coil K2 will lift relay K. Coil 4 of contactor D is identical with coil 3 of contactor U.

As shown, car switch C effects its control of the starting and stopping by means of contactors actuated by it but controls the speed of travel by operating directly upon resistor R without the intervention of contactors. This arrangement, while usually preferred by us, is not, however, necessary to our invention. The conductor from contacts 7 and 8 of automatic stopping switches $S_u$ and $S_d$, which, as shown, proceeds directly to the junction of resistor steps R1 and R2, whereby R1 is short-circuited by contacts 7 and 8, may obviously instead be utilized to actuate a contactor which in turn short-circuits resistor step R1. Similarly the conductor proceeding from car switch fingers C7 and C8 to short-circuit resistor step R3 may obviously instead be similarly utilized to actuate a contactor which short-circuits R3, and so forth throughout the various car switch positions. In case this alternative arrangement is used, the added contactors will preferably not be mounted on the car, so that flexible conductors or "traveling" leads will be added accordingly. Those skilled in the art will readily be able to devise such modified arrangement if desired.

Having described the apparatus, we proceed to describe the operation of the system. Refer to Fig. 1.

First will be described the starting of the car when standing at an automatic stop position. When thus at rest, all parts are in the positions shown, contactor H being energized through the right hand contact of relay K and contactor H will accordingly hold open the short-circuit around the resistor $R_d$ in the damping field circuit. To start the car the operator advances his car switch to the left, to or beyond the second operating position, i. e., into contact upon C6. Contactor D is thus closed through a circuit from exciting bus 9 through the segment of master switch C, finger C6, coil 4, thence through coil K2 on relay K to exciting bus 10. If the car switch has been advanced to or beyond finger C8, resistor step R1, as well as step R2 and perhaps other resistor steps will have been short-circuited directly by the car switch. If the car switch has been advanced to finger C6 but not beyond, resistor R1 will momentarily remain in circuit, being short-circuited an instant later by the withdrawal of the automatic stopping switches, as will next be explained.

It has been shown that the circuit which energizes coil 4 for closing contactor D also energizes coil K2. Thus relay K is lifted. When K is thus lifted, it opens the circuit to the coil of contactor H, so that contactor H drops closed and short circuits the resistor in circuit with the damping winding $F_d$ of the generator. The lifting of relay K energizes magnet SM which thereupon withdraws the automatic leveling switches $S_u$ and $S_d$. The withdrawal of $S_u$ and $S_d$ removes them from engagement with their cams and also short-circuits resistor step R1 as mentioned. Resistor R1 being thus short-circuited, and as many additional sections of resistor R being short-circuited as correspond to the degree of advancement of the car switch, and contactor D being closed, the field F of generator G is excited and motor M starts in the normal manner. A start in the opposite direction occurs in a similar manner. Next will be described the stopping of the motor solely by manual control. Consider the car switch C held in an operating position to the left at or beyond finger C6. Magnet 4 of contactor D is energized, the path being from exciting bus 9 through finger C2, the car switch segment, finger C6, coil 4, coil K2, thence to exciting bus 10. Magnet 2 of contactor D is also energized, the circuit being from exciting bus 9 through finger C2, the segment, finger C4, coil 2, thence directly to exciting bus 10. Contactor D is therefore closed, relay K is lifted, in the same manner as explained previously and contactor H is in the closed circuit position. Magnet SM is energized through contact 11 of relay K and automatic stopping switches $S_u$ and $S_d$ are withdrawn and their contacts 5, 6, 7, 8 are all closed. The car is thus running at either full speed or at some partial speed, according as all or only part of resistor R is short-circuited by the car switch. To stop the car without the use of the automatic stopping control car switch C is moved directly to the "off" or center position shown in Fig. 1. Coil 2 and coil 4 of contactor D are both thus positively deenergized so that contactor D opens and disconnects the excitation of the generator field and brings the car to rest. Those familiar with the elevator art will appreciate that in this connection a mechanical brake and a controlling means therefor are implied, so contrived that the brake sets in an appropriate manner in conjunction with the "off" or stopping position of the control equipment.

Such braking systems are well understood and this feature has been intentionally omitted from the drawing since it would not help to a quick understanding of the invention. As the speed of the motor M decreases, relay K continues held up by coil K1, so that contactor H remains unenergized and the damping winding $F_d$ has the minimum resistance in its circuit and hence the strongest effect. When the voltage across motor M has dropped to a low value, coil K1 will let relay K drop, which will energize the coil of contactor H, thereby opening contactor H and reducing the strength of the damping circuit. This feature is provided as an aid in making an accurate automatic stop as will appear later, and is of particular importance in this connection. However, even in stopping by hand control this feature by which the damping field strength is thus decreased is slightly beneficial, as it quickens the rate of retardation at a time when the retardation would otherwise proceed at its slowest rate.

It will be understood that, whereas each mode of operation may be explained herein with reference to only one direction of motion, the operation in the opposition direction of motion will occur by a like process of control effected by the correspondingly opposite devices.

Next will be described the stopping of the motor by the automatic control. As before, consider car switch C in an operating position to the left, at or beyond finger C6, in which case contactor D is closed, relay K is lifted, contactor H is deenergized and accordingly closed and the automatic stopping switches are withdrawn. For making an automatic stop most expeditiously the operator must exercise some slight degree of skill, that is to say, he must initiate a retardation at a suitable moment and in such fashion that the car does not fail to arrive within the automatic stopping zone of the desired floor but does so arrive at a speed not too great for proper cooperation of the automatic stopping equipment. It will be explained hereinafter how an automatic stop may still be made in case the operator initially misjudges his stop and fails to arrive within the stopping zone in the preferred manner. Although some slight degree of skill must be exercised by the operator as has been stated, different manipulations of the car switch may be used successfully for obtaining an automatic stop, according to the habit and preference of the individual operator, some operators tending habitually to use one manipulation, some another.

Probably the preferable manipulation is for the operator first to retard the car switch to the second operating position at which finger C6 is still in contact but C8 is not. This causes no change except the introduction of resistor steps R5 to R2 inclusive. Since the automatic stopping switches remain withdrawn, resistor step R1 remains short-circuited by contacts 7 and 8. Thus the car is retarded to a low speed but tends to continue in motion indefinitely. When the car arrives within the automatic stopping zone, the operator retards the car switch slightly so that finger C6 opens but finger C4 continues in contact. The opening of the circuit at C6 deenergizes coil 4 of contactor D and coil K2 of relay K. Coil 2 of contactor D, however, continues to be energized, the circuit being from exciting bus 9 through finger C2, the segment, finger C4, contact 6 on automatic stopping switch $S_u$ through coil 2 thence directly to exciting bus 10. When element K2 was deenergized, as mentioned, it dropped and left relay K subject only to the holding effect of coil K1 energized by the terminal voltage of motor M. The adjustment of element K1 is such that, when thus released, it will drop before the terminal voltage of the motor has decreased to that corresponding to either the first or the second operating position of the car switch. K1 therefore drops now and in so doing opens contact 11 which deenergizes magnet SM and thus releases automatic stopping switches $S_u$ and $S_d$. Switch $S_d$ is now alongside $CAM_d$, and in general the roller of $S_d$ will drop upon the highest level surface of this cam so that switch $S_d$ is held by its cam and its contacts 6 and 8 remain closed. A circuit is thereby maintained from the car switch as before, via finger C4, thence through contact 6 whereby coil 2 continues to be energized. Contactor D therefore continues closed. When the automatic stopping switches were thus released by magnet SM as described, switch $S_u$ was not alongside $CAM_u$ with which it cooperates and, by construction, switch $S_u$ could not engage with $CAM_d$. Switch $S_u$ therefore dropped all the way when thus released by magnet SM, and both its contacts 5 and 7 open.

When car switch C was thus retarded to the first operating position, C4 being in contact but C6 and all fingers beyond being out of contact, the car switch no longer maintained a short-circuit around resistor step R1. However, $R_1$ continues short-circuited by contact 8 of automatic stopping switch $S_d$.

Thus the car continues downward at a speed equal to that provided by the second operating position of car switch C. As the motion proceeds, however, the roller of switch $S_d$ drops to the intermediate surface of $CAM_d$, whereupon contact 8 opens. As contact 7, in parallel with 8 is already open, resistor step R1 is introduced in circuit, thus further reducing the excitation of generator G and accordingly the speed of motor M and the car. As the downward motion proceeds further, the roller of switch $S_d$ drops again and contact 6 also opens, thereby deenergizing coil 2 of contactor D. As coil 4 was previously deenergized, contactor D now opens, thus including the generator field F in a local discharge circuit with the resistor T1. The generator will thus be quickly deenergized and as a consequence the driving motor will also be quickly deenergized. It will be understood that we intend a mechanical brake to be also applied, as previously explained. Thus the car is brought to rest at a position determined by the position of $CAM_d$ in the hatchway.

Coincidently with the beginning of the above described operation of the control ensuing from the retardation of car switch C to the position in which C4 continues in contact but C6 opens its contact, another controlling function occurs as follows: Relay K has been described as dropping. The dropping of relay K closes contact 12 whereby the coil of contactor H is energized. Contactor H thus picks up, opens its contact and introduces the maximum resistance into damping winding $F_d$ of generator G, or if found preferable this damping circuit may thus be opened entirely. The weakening of the damping effect in this manner while the automatic stopping control is in operation is advantageous because it quickens the response of the generator magnetism to the reduction of excitation impressed by the automatic stopping control. Those skilled in the art will understand how a small time-constant of the generator is thus permissible when demagnetizing low values of generator magnetism and may be necessary for the desired facility of response of the generator to the automatic stopping control function, but how, on the other hand, a greater time-constant of the generator may be required for the functions of acceleration and retardation to and from full speed by means of the car switch.

It will be observed that when the car switch is thus centered at the "off" position both coils of contactors U and D are definitely opened and maintained open by car switch C, irrespective of the position of either micro-leveling switch $S_u$ or $S_d$. Thus, during the automatic stopping process, if any reason suddenly arises whereby the car should be stopped immediately the operator is able to do so. Thus also a faulty adjustment or defective mechanical condition of any of the devices supplied particularly for automatic stopping purposes is unable to interfere with the ability of the operator to stop the motion of the car at will. We consider these characteristics to be advantages of our invention.

It may readily happen that the operator will at times be late in retarding the car switch in which case the dropping of relay K and the consequent release of the automatic stopping switches may allow automatic leveling switch $S_d$ to cooperate with $CAM_d$ too late or the release of the automatic leveling switches may not occur until $S_d$ has passed entirely beyond $CAM_d$. Thus the car will "slide" beyond the predetermined automatic position before coming to rest. Unless the "slide" thus occurring beyond the automatic stop position has been considerable, switch $S_u$ will now be in cooperation with its cam, contact 5 and perhaps contact 7 being closed. If the car switch continues to be held in the first operating position downward, the significant circuits are now as follows: Coil 2 of contactor D is not energized because contact 6 is open on automatic leveling switch $S_d$; likewise coil 4 of contact D is not energized because finger C6 is open, so that contactor D does not remain closed. Although contact 5 on switch $S_u$ may now be in the closed position, depending on how far the car has slid beyond the automatic position, coil 1 on contactor U is not energized because finger C3 is not in contact, furthermore coil 3 on contactor U is not energized because finger C5 is not in contact. Thus contactor U does not close.

Thus it is impossible to obtain, by means of the automatic stopping control, a return of the car upward to the automatic stop position while the car switch continues in the first or automatic stopping position downward. When, under the assumed conditions of manipulation, the car has thus slid by the automatic stop position as described, but has not slid so far as to let switch $S_u$ run out of engagement with its cam, the operator may obtain an automatic stop by advancing the car switch to the first operating position upward so that finger C3 makes contact, whereupon coil 1 of contactor U will be energized through finger C3 thence through contact 5 and automatic stopping will proceed in a similar manner to that described.

It has been stated that an automatic stop can be made expeditiously by different manipulations of the car switch. A second mode of manipulation and the consequent process of control are as follows: The car being in motion downward as before, the operator may retard car switch C immediately to the first operating position in which finger C4 is in contact but C6 is out of contact. Coil 4 and coil K2 are deenergized thereby but coil 2 remains energized, as will be understood from preceding explanations. Contactor D therefore continues closed. Although element K2 drops, coil K1 continues energized by the voltage of motor M and accordingly continues to hold up relay K, so that contact 11 remains closed and contact 12 remains open. Thus automatic stopping switches $S_d$ and $S_u$ continue withdrawn, resistor $R_1$, continues short-circuited by contacts 7 and 8, and contactor H remains unenergized and closed. As soon as the speed of the motor M has retarded sufficiently, coil K1 will permit relay K to drop, whereupon contact 11 will open and contact 12 will close. Thus contactor H will be energized and will weaken the effect of damping winding $F_d$ and magnet SM will be deenergized, allowing switches $S_d$ and $S_u$ to become operative. If the car has reached the automatic stopping zone, so that switch $S_d$ has come alongside $CAM_d$, switch $S_d$ will be held by this cam but switch $S_u$ will not be alongside its cam and will drop all the way. Accordingly contacts 5 and 7 will be open, contact 6 will be closed and contact 8 may be closed or open. If closed, contact 8 will open with the further downward movement of the car. Thus contactor D will continue closed. Thus also resistor step R1 may first remain shunted but the shunt of this resistor will open with the further movement of the car. The downward motion of the car will therefore proceed accordingly until the roller of switch $S_d$ drops to the lowest position, whereupon contact 6 will open, and will open contactor D thereby stopping the car as explained hereinbefore.

In the manipulation of the car switch last described, if car switch C is retarded prematurely to the first operating position, the voltage of motor M may decrease to the dropout point of element K1 so early that automatic stopping switch $S_d$ is released thereby before it has come alongside its cam. If so, $S_d$ will drop all the way, thus opening contactor D and bringing the car to rest short of the automatic stopping zone before switch $S_d$ has a chance to cooperate with its cam. Under this condition an automatic stop is not obtained. It will be clear from the various descriptions hereinbefore that the operator may now make an automatic stop by advancing the car switch in the same direction as previously, namely downward, thereby moving the car downward into the stopping zone, whereupon he may retard the car switch to the first operating position in the same direction whereby an automatic stop will be obtained.

As still another option, which we do not prefer but which may be practiced by some operators, an automatic leveling stop may be made by first retarding the car switch to the off position at such a moment that the car is able to "slide" into the stopping zone, whereupon the car switch will be advanced to the first operating position in order to obtain an automatic stop. The detailed process of control under this manipulation will be understood by reference to Fig. 1 and the descriptions hereinbefore.

Those who are skilled in the art will understand, from the preceding descriptions and from a further reading of Fig. 1, that an operator who so prefers may make an automatic stop by first reversing the car switch to the first or second position opposed to the motion of the car, and then utilizing the appropriate automatic stopping position of the car switch when the car has entered the automatic stopping zone.

We have said that various features necessary or advantageous in practice for the operation of an elevator are not shown but can readily be supplied by those skilled in the art. However, one such feature which we usually prefer to include will be particularly explained, since this feature although actually not essential to the operation of our invention might very possibly be misunderstood in this respect. We generally prefer to include this feature in the control of a group of dynamo-electric machines as in Fig. 1, particularly if applied to elevators, whether or not such apparatus is provided with automatic stopping control. The feature referred to is shown in Fig. 3 which is a partial diagram only and is applicable equally whether or not automatic stopping is used. The magnet A on contactor U and the similar magnet B on contactor D are each built to have a short air gap in the position shown and a proportionately great increase in air gap when its associated contactor has closed, in order that the holding effect of the magnet A or B may be strong if energized while its contactor is open but weak if energized after its contactor has closed. The coils of these magnets A and B are connected to be energized by the terminal voltage of motor M. When motor M is at rest, or nearly so, magnet B of contactor D, for example, is energized only weakly if at all, and cannot prevent the closure of contactor D by its magnet 2 or magnet 4. When contactor D has closed, the voltage of motor M may rise to its maximum value but magnet B although highly energized, acts only through a long air gap and can therefore not open contactor D. However, as contactor U is open the air gap of magnet A is short and magnet A, being thus highly energized, holds contactor U in the open position even against the effect of a later energization of coil 3. The utility of the feature thus provided by magnets A and B is manifested when the car switch is quickly reversed, opening contactor D and tending to close contactor U. Only when the speed, and accordingly the terminal voltage of motor M, have decreased to a low value, will magnet A release contactor U to permit it to close, thus preventing the motor from being reversed at too rapid a rate. We wish it to be understood that magnets A and B as in Fig. 3, for the purpose described, may or may not be necessary in an apparatus in accordance with our invention. The occasion for such use of this feature of Fig. 3, where such occasion exists, arises solely from the general characteristics of the dynamo-electric group in combination with the moving structure which it drives and this feature will be equally advantageous in such case whether or not automatic stopping control is provided.

We stated as one of the objects of our invention the provision of a simple system of connections for the purposes set forth. In our invention, as embodied in Fig. 1, it will be observed that the various circuits provided for automatic stopping proceed in a relatively simple and straight-forward manner. The transfer of the contactors U and D from domination by the car switch alone to domination by the automatic stopping switches in conjunction with the car switch and vice versa is accomplished by the provision of two magnets for each contactor. One of these magnets is energized invariably by the same circuit, in response entirely to a certain position of the car switch and in a manner readily comprehended and remembered, and the other magnet is energized invariably by a certain other circuit in response to a certain other position of the car switch in combination with a certain automatic stopping switch position. Element K2 of relay K, which is dominated alike by certain corresponding car switch positions in either direction, is so dominated by a circuit which branches once and proceeds thence by either of two similar paths in a manner readily associated in the mind with the directional position of the car switch. Resistor steps R2, R3 and so forth being in circuit, resistor step R1 is dominated cumulatively by corresponding positions of the respective automatic stopping switches by means of a simple circuit of two equal branches. Thus the inter-relation of the various parts of the apparatus and the manner in which they function respectively is relatively easy to comprehend.

It will be observed that in Fig. 1 car switch C is of a simple type which does not employ a plurality of segments insulated from one another, but employs only a single segment. Those skilled in the art are aware that the form of car switch generally preferred for ordinary elevator operation is one which thus employs either a single segment or a group of segments electrically continuous. It is an advantage of our invention that it can employ a car switch of this ordinary type provided only that such car switch has three or more operating positions in each direction and a central off position. On the other hand, a car switch of the simple electrical arrangement shown is not necessary but our invention tends to be workable with any form of master controller having a sufficient number of speed positions in accordance with any of the arrangements commonly used for reversible motor control.

What we claim as new, and desire to secure by Letters Patent of the United States, is:

1. In combination, an electric motor, a device operated thereby, manually operable switch mechanism for controlling the energization of said motor, limit switch mechanism for said motor comprising a switch member arranged to be operated with said device, and a cooperating stationary member for operating the switch member, and a relay having an energizing coil connected to the terminals of the motor armature and operable to one position in response to the operation of said manually operable switch mechanism to prevent the operation of said switch member by the stationary member, and operable to a second position in response to an operation of the manually operable switch mechanism and said coil in accordance with the terminal voltage of the motor to permit the operation of the switch member by the stationary member.

2. In combination, an electric motor, a device operated thereby, manually operable switch mechanism for controlling the starting and stopping of the motor, limit switch mechanism for controlling the stopping of the motor and said device, the said limit switch mechanism comprising a movable switch member carried by said device and a plurality of cooperating stationary members located adjacent selected stopping places for the device, electroresponsive means operable to one position responsively to the operation of said manually operable switch mechanism to prevent cooperation of said movable switch member and the stationary members, and operable to a second position in response to the operation of said manually operable switch mechanism and the terminal voltage of the motor to permit their cooperation, and connections whereby the said manually operable switch mechanism is selectively effective to either start or stop the said motor independently of said limit switch mechanism, or to render the said electroresponsive means effective to control the said limit switch mechanism, and automatically stop the said device at a selected stopping place.

3. In combination, an electric motor, a device operated thereby, a multi-position master switch for the motor, limit switch mechanism for automatically stopping the device, electroresponsive means for controlling the said limit switch mechanism, the said means being under the control of the said master switch in selected positions thereof to prevent an automatic stop and being under the control of a motor operating condition in other selected master switch positions to effect an automatic stop, the said limit switch mechanism having a plurality of separate members located at selected stopping places for the device and cooperating mechanism carried by the device, and connections whereby the device is either started or stopped at the will of the operator, independently of said limit switch mechanism, or the limit switch mechanism is rendered effective to automatically stop the device at a selected stopping place in response to selective operations of said master switch.

4. In combination, an electric motor, a device operated thereby, a reversing controller for the motor, limit switch mechanism for the motor comprising switch contact mechanism carried by said device and a plurality of cooperating stationary members located adjacent stopping places for the device, electroresponsive means responsive to a motor operating condition for controlling the cooperation of said contact mechanism with said stationary members, and connections whereby the said reversing controller is selectively effective to either start or stop the motor, independently of said limit switch mechanism for each direction of operation of the said device, or to render the said electroresponsive means effective to control the said limit switch mechanism and automatically stop the said device at a selected stopping place for each direction of operation of the device.

5. In combination, an electric motor, an elevator operated thereby, a reversing master controller and electroresponsive reversing switch mechanism controlled thereby for controlling the motor, limit switch mechanism for controlling the said reversing switch mechanism, comprising switch contact mechanism carried by the elevator and cams located along the elevator shaft adjacent selected stopping places for governing the contact mechanism, electroresponsive means responsive to the speed of the elevator for controlling said contact mechanism, and connections whereby the said controller is selectively effective to start and stop the motor independently of said limit switch mechanism for each direction of operation of the elevator, or to render the said electroresponsive means effective to control the said limit switch contact mechanism and said motor reversing switch mechanism, and automatically stop the elevator at a selected stopping place for each direction of elevator operation.

6. In an electric drive for elevators, an electric motor, an elevator car driven thereby, a reversing, speed-governing, multi-position master controller carried by the elevator car and reversing contactors controlled thereby for controlling the motor, automatic stop mechanism for the motor comprising switch contact mechanism carried by the said car and a cooperating pair of oppositely disposed cams located adjacent each landing, an electromagnet controlled by the said controller and in response to the speed of the said car for controlling said contact mechanism, and connections whereby in selected positions of said controller the said reversing contactors are governed independently of said stop mechanism and in other selected positions of the controller the said electromagnet holds the said contact mechanism out of cooperative relation with said cams until the speed of the car has reduced to a predetermined value and then gives the control of the contact mechanism to the cams adjacent an approaching landing to effect an automatic stop for the car substantially exactly at the said landing.

7. In an electric drive for elevators, an electric motor, an elevator car driven thereby, a multi-position master controller carried by the car for controlling the starting and stopping of the motor, automatic stopping mechanism for the motor comprising a switch contact mechanism carried by the car and a cooperating pair of oppositely disposed cams located adjacent each landing, a relay having an energizing coil connected to the terminals of the motor armature and operable in response to the terminal voltage of the motor to prevent the cooperation of the cams and the switch contact mechanism to stop the motor when the speed of the motor is above a predetermined value and to permit their cooperation to stop the motor for selected position of the master controller when the speed of the motor has decreased from normal speed to a predetermined lower value.

8. In an electric drive for elevators, an electric motor, an elevator car driven thereby, a reversing, speed governing, multi-position master controller carried by the elevator car, reversing contactors controlled thereby for controlling the motor, limit switch mechanism for the motor comprising a movable switch member carried by the car and a plurality of cooperating stationary members located at selected stopping places, an electromagnet for controlling the cooperation of the movable switch member and the stationary members, and relay means for controlling the energization of the electromagnet, said relay means being operable to one position responsively to the operation of the master controller to energize the electromagnet to prevent cooperation of the movable switch member and the stationary member, and operable to a second position responsively to the terminal voltage of the motor and the movement of the controller to a selected position to deenergize the electromagnet and permit the cooperation of the movable switch member and the stationary member.

9. In a system for the control of electric motor driven elevators, an electric motor, an elevator car driven thereby, a multi-position master controller for controlling the starting and stopping of the motor, reversing contactors controlled thereby for controlling the starting and stopping of the motor, limit switch mechanism comprising a movable switch member carried by the car and a plurality of cooperating stationary members located at selected stopping points, an electromagnet for controlling the cooperation of the movable switch member and the stationary members, electromagnetic means controlled by the movable switch member for maintaining the reversing contactors in operated position for selected positions of the master controller and a relay operable in selected positions of the master control to energize the electromagnet to prevent the cooperation of the movable switch member and the stationary members, and operable responsively to the terminal voltage of the motor for other selected positions of the master controller to permit the cooperation of the movable switch member and the stationary members to energize the reversing controllers.

In witness whereof, we have hereunto set our hands this 19th day of April, 1926.

MAX A. WHITING.
ELLIOTT D. HARRINGTON.